United States Patent
Szigeti et al.

(10) Patent No.: US 12,113,830 B2
(45) Date of Patent: Oct. 8, 2024

(54) FRICTIONLESS SUPPLEMENTARY MULTI-FACTOR AUTHENTICATION FOR SENSITIVE TRANSACTIONS WITHIN AN APPLICATION SESSION

(71) Applicant: Cisco Technology, Inc., San Jose, CA (US)

(72) Inventors: Thomas Szigeti, Vancouver (CA); David John Zacks, Vancouver (CA); Walter T. Hulick, Jr., Pearland, TX (US); Tal Maoz, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 339 days.

(21) Appl. No.: 17/216,845

(22) Filed: Mar. 30, 2021

(65) Prior Publication Data

US 2022/0321602 A1    Oct. 6, 2022

(51) Int. Cl.
*H04L 9/40* (2022.01)
*G06F 9/455* (2018.01)
*G06F 9/54* (2006.01)

(52) U.S. Cl.
CPC .......... *H04L 63/20* (2013.01); *G06F 9/4552* (2013.01); *G06F 9/547* (2013.01)

(58) Field of Classification Search
CPC ......... H04L 63/20; G06F 9/4552; G06F 9/547
See application file for complete search history.

(56) References Cited

U.S. PATENT DOCUMENTS

| 8,494,961 | B1* | 7/2013 | Lucas | G06Q 20/40145 705/40 |
|---|---|---|---|---|
| 2010/0192209 | A1* | 7/2010 | Steeves | H04L 63/08 726/7 |
| 2014/0282876 | A1* | 9/2014 | Schentrup | H04L 63/10 726/3 |
| 2014/0317704 | A1* | 10/2014 | Schentrup | H04L 63/0815 726/6 |
| 2016/0057168 | A1* | 2/2016 | Reddock | H04L 63/105 726/1 |
| 2016/0110528 | A1* | 4/2016 | Gupta | G06F 21/577 726/19 |
| 2017/0024304 | A1* | 1/2017 | Dirscherl | G06F 11/28 |
| 2018/0063132 | A1* | 3/2018 | Zhang | G06F 21/14 |

FOREIGN PATENT DOCUMENTS

| CN | 110619208 A | * | 12/2019 | ............ G06F 16/27 |
| JP | 2021504860 A | * | 2/2018 | ............ H04L 9/50 |

\* cited by examiner

*Primary Examiner* — Matthew Smithers
*Assistant Examiner* — Shu Chun Gao
(74) *Attorney, Agent, or Firm* — Polsinelli P.C.

(57) ABSTRACT

The present technology includes applying a security policy by an application security system to a transaction within an application that is monitored by the application security system. The present technology includes monitoring transaction occurring between a client device an application over a network. The present technology also includes identifying a first transaction from the transactions as a sensitive transaction. The sensitive transaction is associated with an authentication policy requiring an authentication. The present technology also includes interrupting the application. The present technology also includes prompting the client device for the authentication.

19 Claims, 11 Drawing Sheets

AppDynamics

Business Transactions

| Details | Filters | Actions | View Options | Configure | | | | Refresh | Last 2 hours ▼ | ? |
|---|---|---|---|---|---|---|---|---|---|---|

800 →

| Name | Original Name | Health | Response Time (ms) | Max Response Time (ms) | Calls | Important transaction? | CPU Used (ms) | Type |
|---|---|---|---|---|---|---|---|---|
| Checkout | ViewCart.sendItems | ! | 2,386 | 66,205 | 726 | ☐ | 50 | StrustA... |
| User Login | User Login | ! | 1,760 | 20,899 | 1,552 | ☐ | 1,066 | Web |
| Order.update | Order.update | ✓ | 1,405 | 11,687 | 649 | ☐ | - | StrustA... |
| Fetch Catalog | ViewItems.getAllItems | ! | 484 | 19,233 | 968 | ☑ | 27 | StrustA... |
| Add to Cart | ViewCart.addToCart | ✓ | 19 | 383 | 930 | ☐ | 61 | StrustA... |
| View Cart | ViewCart.address | ✓ | 6 | 275 | 711 | ☑ | - | StrustA... |
| ViewCart.confirmOrder | ViewCart.confirmOrder | ✓ | 6 | 239 | 650 | ☐ | - | StrustA... |
| ViewCart.paymentInfo | ViewCart.paymentInfo | ✓ | 6 | 238 | 681 | ☐ | - | StrustA... |
| Homepage | / | ✓ | 4 | 31 | 2,291 | ☐ | - | Servlet |
| 404.jsp | /404.jsp | ✓ | 0 | 15 | 720 | ☐ | - | Servlet |

FRICTIONLESS SUPPLEMENTARY MULTI-FACTOR AUTHENTICATION FOR SENSITIVE TRANSACTIONS WITHIN AN APPLICATION SESSION

DESCRIPTION OF THE RELATED TECHNOLOGY

The present technology pertains to applying a security policy by an application security system to a transaction within an application session, and more specifically pertains to the application security system monitoring transactions between a client and a web application to identify specific transactions and require additional authentication to proceed.

BACKGROUND

Networking and security policies have long operated at the level of the application where certain authentications must be met to access a given application and certain policies are applied through an authenticated session. However, this paradigm ignores that certain transactions within an application may be more sensitive than others, and as such a single authentication may not be optimal. Most applications today require authentication at initial login (only) and may maintain sessions for hours or even days-leaving a window wide-open for abuse. Additionally, once a user gains access to an application, he/she is typically able to perform any transaction within the application without any supplemental challenge. Such applications sessions are vulnerable to being hijacked and abused, which often happens within the workplace, as indicated by Forrester's "State Of Data Security And Privacy, 2020" report that indicates that 25% of all breaches are attributable to internal attacks, nearly half of which include malicious intent. This problem can be solved by requiring application developers to modify their applications. However, it has been found that when the developers have to re-engineer these applications, manually identify sensitive transactions, and then program additional authentication, this approach had exceptionally low adoption.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which:

FIG. 8 illustrates a user interface for configuring different transactions according to an example of the instant disclosure.

DETAILED DESCRIPTION

Figure 1:
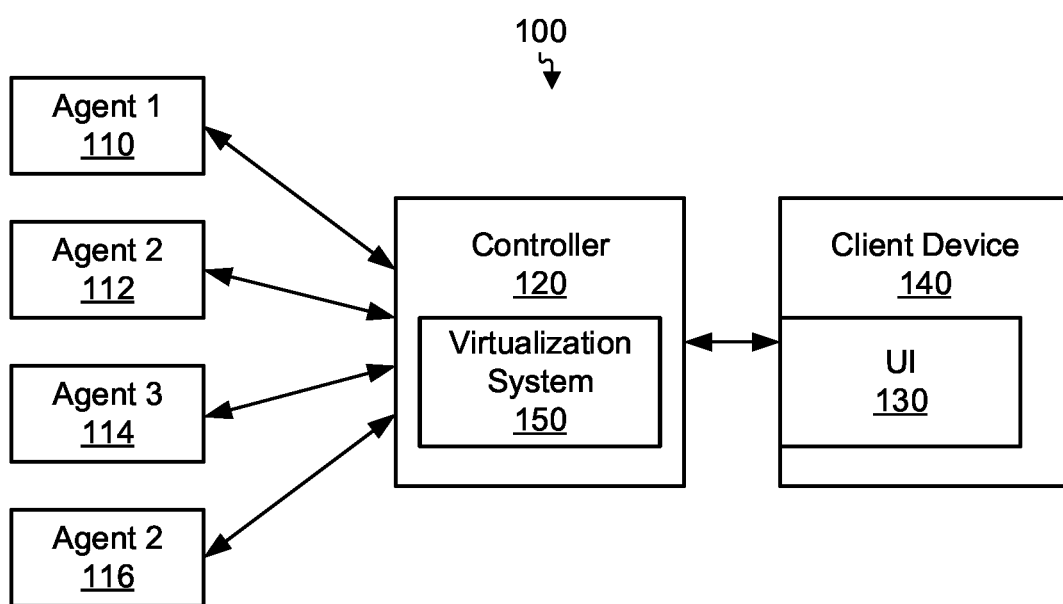
FIG. 1 is a block diagram of an exemplary application performance monitor (APM) that can intelligently monitor a network device according to an example of the instant disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Methods, systems, and non-transitory computer-readable media are provided for applying a security policy by an application security system to a transaction within an application that is monitored by the application security system.

A method can include monitoring transactions occurring between a client device and the application over a network. The method can also include identifying a first transaction from the transactions as a sensitive transaction, wherein the sensitive transaction is associated with an authentication policy requiring an authentication. The method can also include interrupting the application. The method can also include prompting the client device for the authentication.

In some embodiments, the method can further include defining the authentication policy for a class of transactions, wherein the authentication policy requires an authentication for the class of transactions, wherein the first transaction is in the class of transactions.

In some embodiments of the method, the authentication policy requires a multifactor authentication, a continuous multifactor authentication, a supplementary password authentication, a secret question authentication, a Yubikey check, or an explicit device-driven facial recognition authentication.

In some embodiments of the method, the class of transactions is defined by a transaction name, wherein the transaction name is a concatenation of a TCP socket and a URI stem, or a customized name.

In some embodiments of the method, identifying the first transaction as a sensitive transaction includes configuring the application security system to classify transactions having a transaction name matching a filter or specific string as sensitive. Identifying the first transaction as a sensitive transaction also includes matching the first transaction by its name to the filter or specific string.

In some embodiments of the method, configuring the application security system to classify the transaction includes presenting a graphical user interface listing a plurality of transactions recorded by the application security system. Configuring the application security system to classify the transaction also includes receiving a selection of a subset of the plurality of transactions in the graphical user interface, wherein the selection of the subset of the plurality of transactions is used to configure the application security system to classify transactions in the selection as sensitive.

In some embodiments of the method, identifying the first transaction as a sensitive transaction includes applying a supervised machine learning algorithm to identify a transaction name that is associated with the sensitive transaction.

In some embodiments of the method, interrupting the application includes intercepting, by the application security system, a call to an API for sensitive transactions in a runtime environment by using Byte Code Injection into a Java Virtual Machine (JVM).

In some embodiments, after prompting the client device for the authentication, the method further includes requesting at least one authentication factor from an authentication system. The method further includes receiving the at least one authentication factor from the authentication system. The method further includes evaluating a measure of the at least one authentication factors against an authentication threshold.

In some embodiments, the method further includes, before prompting the client device for the authentication, sending, by the application security system, an instruction to an authentication service effective to configure the authentication service to authenticate a user associated with the client device according to a policy. The method further includes, after prompting the client device for the authentication, receiving, by the application security system, a confirmation from the authentication service that the user associated with the client device has successfully authenticated according to the policy.

In some embodiments, the method further includes receiving, by the application security system, a confirmation from an authentication service that a user associated with the client device has successfully authenticated according to a policy. The method further includes allowing the transaction to proceed.

In some embodiments, the method further includes receiving, by the application security system, a notification from an authentication service that a user associated with the client device has not authenticated according to a policy. The method further includes sending a notification to the client device indicating that an authentication threshold was not cleared, wherein the notification is configured to be presented by a browser window presenting the application, thereby the notification appears to be presented by the application. The method further includes preventing the transaction from proceeding.

In some embodiments of the method, the application security system performs the method without altering source code for the application.

A system can include at least one processor and at least one non-transitory computer-readable medium having stored therein instructions which, when executed by the at least one processor, cause the at least one processor to perform operations. The operations can include monitoring transactions occurring between a client device and the application over a network. The operations can also include identifying a first transaction from the transactions as a sensitive transaction, wherein the sensitive transaction is associated with an authentication policy requiring an authentication. The operations can also include interrupting the application. The operations can also include prompting the client device for the authentication. A non-transitory computer-readable medium can include instructions stored therein which, when executed by a processor, cause the processor to perform operations. The operations can include monitoring transactions occurring between a client device and the application over a network. The operations can also include identifying a first transaction from the transactions as a sensitive transaction, wherein the sensitive transaction is associated with an authentication policy requiring an authentication. The operations can also include interrupting the application. The operations can also include prompting the client device for the authentication.

Description of Example Embodiments

Consider an employee-accessed payroll application within an enterprise network. Employees can perform a multitude of functions within the payroll application. They can view paystubs, view tax information, view bank details, edit bank details, or perform other tasks.

Compared with viewing paystubs, viewing tax information, and viewing bank details, editing bank details represents a far more sensitive transaction, as such a transaction could compromise employee finances. The application provider could alter the source-code of the application to require additional authentications to access resources which enable a user to edit bank details; however, this solution is onerous at best, as altering source code is a sizeable investment and the enterprise may not even operate the source code for these functions (they could be delivered by a contractor, for instance, or could be part of widely-available application). Thus, as it currently stands, the application has a single authentication which applies to all content, no matter how sensitive.

The present technology offers a solution to this problem. It proposes to allow network administrators to apply security policies to within-application transactions, such as editing bank details within the payroll application. It proposes to achieve this feat while meeting three key goals: authenticating transactions in real time, authenticating transactions without interrupting the user's workflow, and authenticating transactions using multiple authentication factors.

The present technology achieves its goals by combining an authentication system with a monitoring system. Using the monitoring system, network administrators can identify classes of transactions for policies and apply them. When such transactions are attempted, they can be routed through the authentication system in accordance with the applied policies before being fulfilled or denied.

The benefits of the present technology are clear. More sensitive information, such as editing bank details on the payroll application, can be better protected, and less sensitive information, such as viewing paystubs, can be more accessible. Further, greater policy granularity can help enterprises lower the likelihood of serious data breaches, which represent a huge cost both in time and money to modern enterprises.

As introduced above, these problems can be solved by requiring application developers to modify their applications. However, it has been found that when the developers have to re-engineer these applications, manually identify sensitive transactions, and then program additional authentication, this approach had exceptionally low adoption. Accordingly, the present technology does not require a developer of a web application to change any code. Rather, the performance monitoring system can identify that a sensitive transaction is being initiated, and can intervene to require a fresh authentication, or a more trustworthy authentication without any modification to the web application.

This disclosure will proceed by first discussing an example monitoring system. Second, the disclosure will discuss an example continuous multi-factor authentication system. Finally, the disclosure will discuss an example computing system which can be used to execute the present technology.

Application Intelligence Platform Architecture

FIG. 1 is a block diagram of an exemplary APM 100 that can implement intelligent monitoring of a network device in a monitored environment as disclosed herein. The application intelligence platform is a system that monitors and collect metrics of performance data for an application environment being monitored. At the simplest structure, the APM 100 includes one or more agents 110, 112, 114, 116 and one or more controllers 120. While FIG. 1 shows four agents communicatively linked to a single controller, the total number of agents and controller can vary based on a number of factors including the number of applications monitored, how distributed the application environment is, the level of monitoring desired, the level of user experience desired, etc.

Controllers and Agents

The controller 120 is the central processing and administration server for the application intelligence platform. The controller 120 serves a browser-based user interface (UI) 130 that is the primary interface for monitoring, analyzing, and troubleshooting the monitored environment. The controller 120 can control and manage monitoring of business transactions distributed over application servers. Specifically, the controller 120 can receive runtime data from agents 110, 112, 114, 116 and coordinators, associate portions of business transaction data, communicate with agents to configure collection of runtime data, and provide performance data and reporting through the interface 130. The interface 130 may be viewed as a web-based interface viewable by a client device 140. In some examples, a client device 140 can directly communicate with controller 120 to view an interface for monitoring data.

In the Software as a Service (SaaS) implementation, a controller 120 instance is hosted remotely by a provider of the APM 100. In the on-premise (On-Prem) implementation, a controller 120 instance is installed locally and self-administered.

The controllers 120 receive data from different agents 110, 112, 114, 116 deployed to monitor applications, databases and database servers, servers, and end user clients for the monitored environment. Any of the agents 110, 112, 114, 116 can be implemented as different types of agents for specific monitoring duties. For example, application agents are installed on each server that hosts applications to be monitored. Instrumenting an agent adds an application agent into the runtime process of the application.

Database agents are software (e.g., Java program) installed on a machine that has network access to the monitored databases and the controller. Database agents queries the monitored databases to collect metrics and passes the metrics for display in the metric browser-database monitoring and in the database pages of the controller UI. Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents are standalone programs (e.g., standalone Java program) that collect hardware-related performance statistics from the servers in the monitored environment. The standalone machine agents can be deployed on machines that host application servers, database servers, messaging servers, Web servers, etc. A standalone machine agent has an extensible architecture.

End user monitoring (EUM) is performed using browser agents and mobile agents to provide performance information from the point of view of the client, such as a web browser or a mobile native application. Browser agents and mobile agents are unlike other monitoring through application agents, database agents, and standalone machine agents that are on the server. Through EUM, web use (e.g., by real users or synthetic agents), mobile use, or any combination can be monitored depending on the monitoring needs. Browser agents (e.g., agents 110, 112, 114, 116) can include Reporters that report monitored data to the controller.

Browser agents are small files using web-based technologies, such as JavaScript (i.e., ECMAScript) agents injected into each instrumented web page, as close to the top as possible, as the web page is served and collects data. Once the web page has completed loading, the collected data is bundled into a beacon and sent to the EUM cloud for processing and ready for retrieval by the controller. Browser real user monitoring (Browser RUM) provides insights into the performance of a web application from the point of view of a real or synthetic end user. For example, Browser RUM can determine how specific networks requests (e.g., asynchronous Javascript and XML (AJAX)) or iframe calls are slowing down page load time and how server performance impacts end user experience in aggregate or in individual cases.

A mobile agent is a small piece of highly performant code that is added to the source of the mobile application. Mobile RUM provides information on the native iOS or Android mobile application as the end users actually use the mobile application. Mobile RUM provides visibility into the functioning of the mobile application itself and the mobile application's interaction with the network used and any server-side applications the mobile application communicates with.

The controller 120 can include a visualization system 150 for displaying the reports generated by the Reporters at the browser agents. In some examples, the visualization system 150 can be implemented in a separate machine (e.g., a server) different from the one hosting the controller 120.

Application Intelligence Monitoring

The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling

Entities in the application environment (such as the JBoss service, MQSeries modules, and databases) and the services provided by the entities (such as a login transaction, service or product search, or purchase transaction) are mapped to an application intelligence model. In the application intelligence model, a business transaction represents a particular service provided by the monitored environment. For example, in an e-commerce application, particular real-world services can include user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions

A business transaction representation of the particular service provided by the monitored environment provides a view on performance data in the context of the various tiers that participate in processing a particular request. A business transaction represents the end-to-end processing path used to fulfill a service request in the monitored environment. Thus, a business environment is a type of user-initiated action in the monitored environment defined by an entry point and a processing path across application servers, databases, and potentially many other infrastructure components. Each instance of a business transaction is an execution of that transaction in response to a particular user request. A business transaction can be created by detecting incoming requests at an entry point and tracking the activity associated with the request at the originating tier and across distributed components in the application environment. A flow map can be generated for a business transaction that shows the touch points for the business transaction in the application environment.

Performance monitoring can be oriented by business transaction to focus on the performance of the services in the application environment from the perspective of end users. Performance monitoring based on business transaction can provide information on whether a service is available (e.g., users can log in, check out, or view their data), response times for users, and the cause of problems when the problems occur.

Business Applications

A business application is the top-level container in the application intelligence model. A business application contains a set of related services and business transactions. In some examples, a single business application may be needed to model the environment. In some examples, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

Nodes

A node in the application intelligence model corresponds to a monitored server or JVM in the application environment. A node is the smallest unit of the modeled environment. In general, a node corresponds to an individual application server, JVM, or a common language runtime (CLR) on which a monitoring Agent is installed. Each node identifies itself in the application intelligence model. The Agent installed at the node is configured to specify the name of the node, tier, and business application under which the Agent reports data to the Controller.

Tiers

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some examples, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some examples, an application agent node cannot belong to more than one tier. Similarly, a machine agent cannot belong to more than one tier. However, more than one machine agent can be installed on a machine.

Backend System

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

Baselines and Thresholds

The APM 100 uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what a "normal" metric is when the application or infrastructure undergoes change. For these reasons, the APM 100 can perform anomaly detection based on dynamic baselines or thresholds.

The APM 100 automatically calculates dynamic baselines for the monitored metrics, defining what is "normal" for each metric based on actual usage. The APM 100 uses these baselines to identify subsequent metrics whose values fall out of this normal range. Static thresholds that are tedious to set up and, in rapidly changing application environments, error-prone, are no longer needed.

The APM 100 can use configurable thresholds to maintain service level agreements (SLAs) and ensure optimum performance levels by detecting slow, very slow, and stalled transactions. Configurable thresholds provide a flexible way to associate the right business context with a slow request to isolate the root cause.

Health Rules, Policies, and Actions

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, a health rule that tests whether the business transaction response time is much higher than normal can define a critical condition as the combination of an average response time greater than the default baseline by 3 standard deviations and a load greater than 50 calls per minute. In some examples, this health rule can define a warning condition as the combination of an average response time greater than the default baseline by 2 standard deviations and a load greater than 100 calls per minute. In some examples, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some examples, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts, and other suitable remedial actions.

Metrics

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller 120.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported to the controller 120, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment. In some implementations, metrics can also be accessed by a remote procedure call (RPC) framework (e.g., gRPC, SignalR) that transmits binary data. For example, the gRPC framework defines contracts (which are converted into a class or interface) in protocol definition files (.proto) and the binary data can be parsed and analyzed based on the protocol definitions.

Snapshots

Snapshots provide a detailed picture of a given application at a certain point in time. Snapshots usually include call graphs that allow that enables drilling down to the line of code that may be causing performance problems. The most common snapshots are transaction snapshots.

Exemplary Implementation of Application Intelligence Platform

Figure 2:
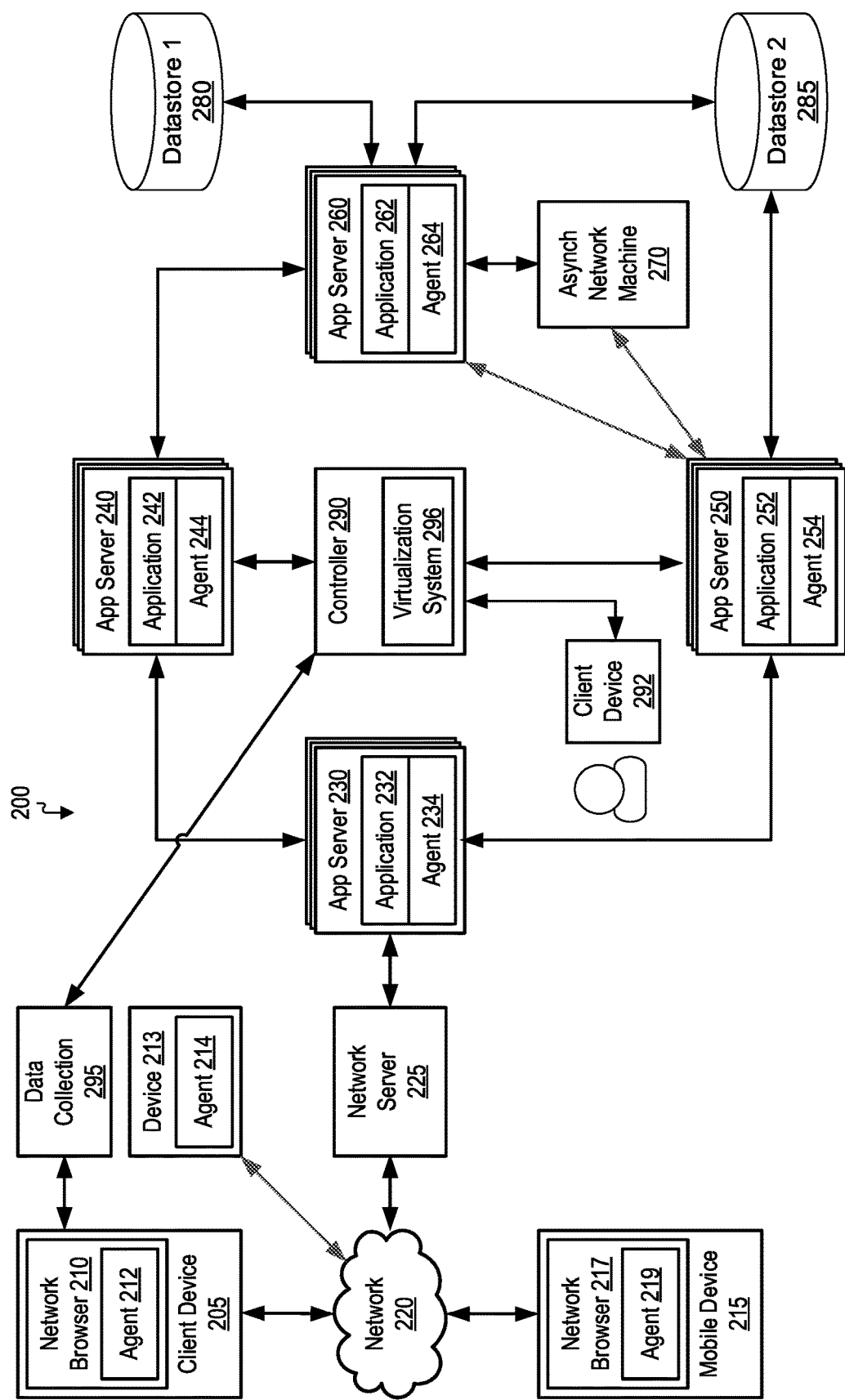
FIG. 2 is a block diagram of an exemplary APM monitoring a network device according to an example of the instant disclosure.

FIG. 2 is a block diagram of an exemplary system 200 for intelligent monitoring of a network device in a monitored environment as disclosed herein, including the processes disclosed with respect to FIGS. 3 to 8. The system 200 in FIG. 2 includes client devices 205 and 292, mobile device 215, network 220, network server 225, application servers 230, 240, 250 and 260, asynchronous network machine 270, data stores 280 and 285, controller 290, and data collection server 295. The controller 290 can include visualization system 296 for providing displaying of the report generated by the Reporters at the browser agents. In some examples, the visualization system 296 can be implemented in a separate machine (e.g., a server) different from the one hosting the controller 290.

Client device 205 may include network browser 210 and be implemented as a computing device, such as for example a laptop, desktop, workstation, or some other computing device. Network browser 210 may be a client application for viewing content provided by an application server, such as application server 230 via network server 225 over network 220.

Network browser 210 may include agent 212 to monitor and facilitate development of a network application. Agent 212 may be installed on network browser 210 and/or client device 205 as a network browser add-on, downloading the application to the server, or in some other manner. Agent 212 may be executed to monitor network browser 210, the operating system of client device 205, and any other application, API, or another component of client device 205. Agent 212 may determine network browser navigation timing metrics, access browser cookies, monitor code, and transmit data to data collection 295, controller 290, or another device. Agent 212 may perform other operations related to monitoring a request or a network at client device 205 as discussed herein including report generation.

Mobile device 215 is connected to network 220 and may be implemented as a portable device suitable for sending and receiving content over a network, such as for example a mobile phone, smart phone, tablet computer, or other portable device. Both client device 205 and mobile device 215 may include hardware and/or software configured to access a web service provided by network server 225.

Mobile device 215 may include network browser 217 and an agent 219. Mobile device may also include client applications and other code that may be monitored by agent 219. Agent 219 may reside in and/or communicate with network browser 217, as well as communicate with other applications, an operating system, APIs and other hardware and software on mobile device 215. Agent 219 may have similar functionality as that described herein for agent 212 on client device 205, and may report data to data collection 295 and/or controller 290.

Device 213 may be implemented as a network device that communicates with other devices over network 220. Device 213 may be communicatively coupled to network 220 via a wireless network, such as for example a WiFi network. Device 210 may also communicate with devices wirelessly via radio frequency networks, such as for example via a BLUETOOTH communication protocol. Device 210 may include one or more applications and one or more agents 211. Agent 211 may be executed to monitor a device application, operating system, resources such as processor, memory, and power usage, network latency and bandwidth, sensors and inputs, API, or another component of device 213. Agent 212 may monitor code, generate performance data from the monitored code, and transmit data to data collection 295, controller 290, or another device. Agent 212 may perform other operations related to monitoring a request or a network at device 213 as discussed herein including report generation.

Network 220 may facilitate communication of data among different servers, devices and machines of system 200 (some connections shown with lines to network 220, some not shown). The network may be implemented as a private network, public network, intranet, the Internet, a cellular network, Wi-Fi network, Voice over IP (VoIP) network, or a combination of one or more of these networks. The network 220 may include one or more machines such as load balance machines and other machines.

Network server 225 is connected to network 220 and may receive and process requests received over network 220. Network server 225 may be implemented as one or more servers implementing a network service, and may be implemented on the same machine as application server 230 or one or more separate machines. When network 220 is the Internet, network server 225 may be implemented as a web server.

Application server 230 communicates with network server 225, application servers 240 and 250, and controller 290. Application server 250 may also communicate with other machines and devices (not illustrated in FIG. 2). Application server 230 may host an application or portions of a distributed application. The host application 232 may be in one of many platforms, such as including a Java, PHP, .Net, and Node.JS, be implemented as a Java virtual machine, or include some other host type. Application server 230 may also include one or more agents 234 (i.e. "modules"), including a language agent, machine agent, and network agent, and other software modules. Application server 230 may be implemented as one server or multiple servers as illustrated in FIG. 2.

In some examples, application 232 and other may be instrumented to modify the application or other software. In the event the application 232 is an interpreted language (e.g., Node.JS, Python, etc.), corresponding code can be injected into the source code, or can be modified at various stages, such as transpiling. In other examples, application 232 and other software on application server 230 may be instrumented using byte code insertion, or byte code instrumentation (BCI), to modify the object code of the application or other software. The instrumented object code may include code used to detect calls received by application 232, calls sent by application 232, and communicate with agent 234 during execution of the application. BCI may also be used to monitor one or more sockets of the application and/or application server in order to monitor the socket and capture packets coming over the socket.

In some examples, server 230 may include applications and/or code other than a virtual machine. For example, servers 230, 240, 250, and 260 may each include Java code, .Net code, PHP code, Ruby code, C code, C++, Rust, ECMAScript, Python or other binary code to implement applications and process requests received from a remote source. References to a virtual machine with respect to an application server are intended to be for exemplary purposes only.

Agents 234 on application server 230 may be installed, downloaded, embedded, or otherwise provided on application server 230. For example, agents 234 may be provided in server 230 by instrumentation of object code, downloading the agents to the server, or in some other manner. Agent 234 may be executed to monitor application server 230, monitor code running in application 232 (or other program language, such as a PHP, .Net, or C program), a virtual machine (e.g., a Docker container), machine resources, network layer data, and communicate with byte instrumented code on application server 230 and one or more applications on application server 230.

Each of agents 234, 244, 254 and 264 may include one or more agents, such as language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 234 may detect operations such as receiving calls and sending requests by application server 230, resource usage, and incoming packets. Agent 234 may receive data, process the data, for example by aggregating data into metrics, and transmit the data and/or metrics to controller 290. Agent 234 may perform other operations related to monitoring applications and application server 230 as discussed herein. For example, agent 234 may identify other applications, share business transaction data, aggregate detected runtime data, and other operations.

An agent may operate to monitor a node, tier, nodes or other entity. A node may be a software program or a hardware component (e.g., memory, processor, etc.). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 290 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 234 may create a request identifier for a request received by server 230 (for example, a request received by a client device 205 or 215 associated with a user or another source). The request identifier may be sent to client device 205 or mobile device 215, whichever device sent the request. In some examples, the request identifier may be created when a data is collected and analyzed for a particular business transaction.

Each of application servers 240, 250 and 260 may include an application and agents. Each application may run on the corresponding application server. Each of applications 242, 252 and 262 on application servers 240, 250, and 260 may operate similarly to application 232 and perform at least a portion of a distributed business transaction. Agents 244, 254 and 264 may monitor applications 242, 252, and 262, collect and process data at runtime, and communicate with controller 290. The applications 232, 242, 252 and 262 may communicate with each other as part of performing a distributed transaction. In particular, each application may call any application or method of another virtual machine.

Asynchronous network machine 270 may engage in asynchronous communications with one or more application servers, such as application server 250 and 260. For example, application server 250 may transmit several calls or messages to an asynchronous network machine. Rather than communicate back to application server 250, the asynchronous network machine may process the messages and eventually provide a response, such as a processed message, to application server 260. Because there is no return message from the asynchronous network machine to application server 250, the communications among them are asynchronous.

Data stores 280 and 285 may each be accessed by application servers such as application server 250. Data store 285 may also be accessed by application server 250. Each of data stores 280 and 285 may store data, process data, and return queries received from an application server. Each of data stores 280 and 285 may or may not include an agent.

Controller 290 may control and manage monitoring of business transactions distributed over application servers 230, 240, 250, and 260. In some examples, controller 290 may receive application data, including data associated with monitoring client requests at client device 205 and mobile device 215, from data collection server 295. In some examples, controller 290 may receive application monitoring data and network data from each of agents 212, 219, 234, 244 and 254. Controller 290 may associate portions of business transaction data, communicate with agents to configure collection of data, and provide performance data and reporting through an interface. The interface may be viewed as a web-based interface viewable by client device 292, which may be a mobile device, client, or any other platform for viewing an interface provided by controller 290. In some examples, a client device 292 may directly communicate with controller 290 to view an interface for monitoring data.

Client device 292 may include any computing device, including a mobile device or a client computer such as a desktop, work station or other computing device. Client device 292 may communicate with controller 290 to create and view a custom interface. In some examples, controller 290 provides an interface for creating and viewing the custom interface as a content page, e.g., a web page, which may be provided to and rendered through a network browser application on client device 292.

Applications 232, 242, 252 and 262 may be any of several types of applications. Examples of applications that may implement applications 232, 242, 252, and 262 include a Java, PHP, .Net, Node.JS, and other applications.

Figure 3:
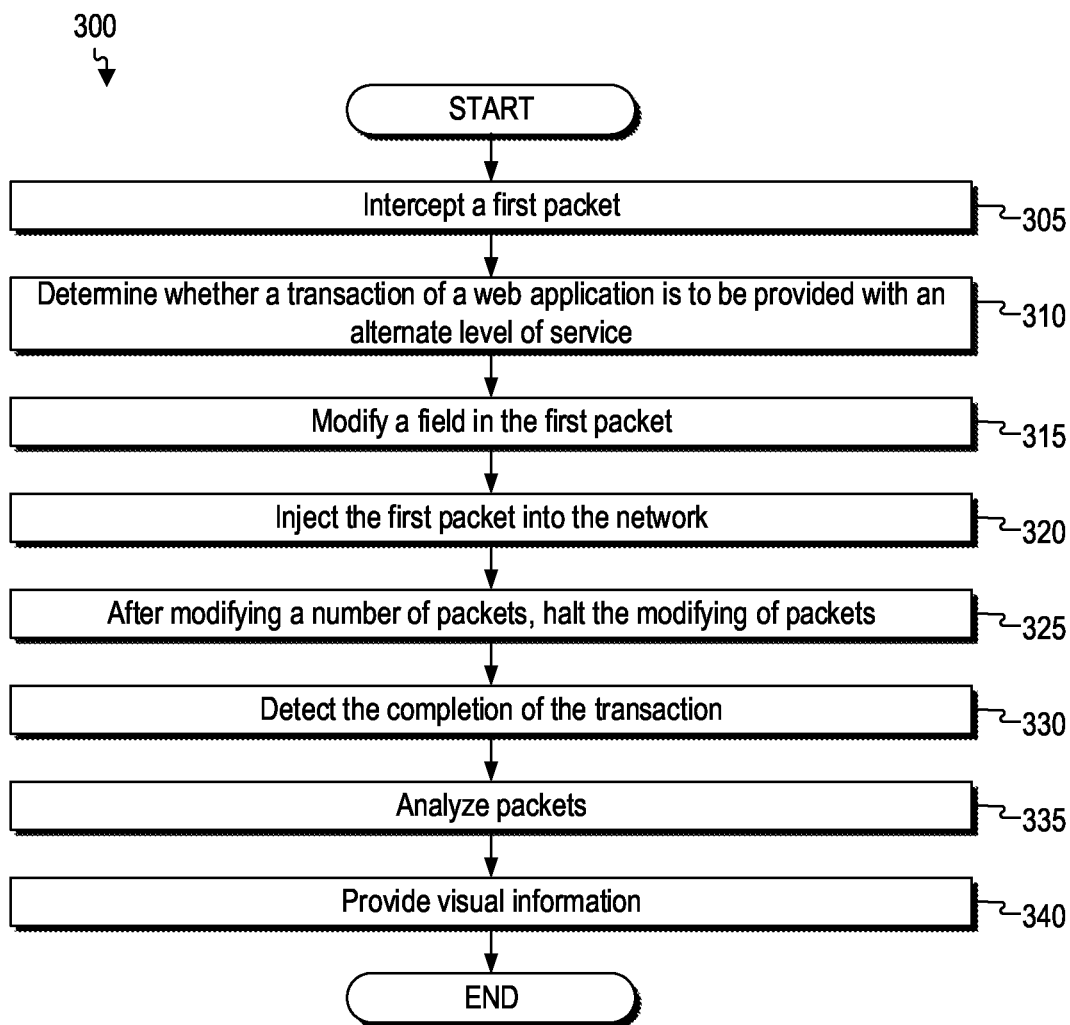
FIG. 3 is a flowchart of a method for configuring network devices for transactions according to an example of the instant disclosure.

FIG. 3 illustrates an example method 300 of prioritizing traffic by an APM that monitors network traffic to and from an application. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method 300 includes intercepting a first packet being transmitted in a network that is monitored by the APM at block 305. For example, the APM 100 illustrated in FIG. 1 may be configured to monitor applications as described above and may intercept a first packet that is transmitted in the network.

After incepting the packet, the method 300 may determine that the first packet is associated with a transaction of the web application that is to be provided with an alternate level of service at block 310. For example, the APM 100 may determine that the first packet is associated with a transaction of the web application that is to be provided with an alternate level of service. As noted above, services may increase or decrease the level of service based on different factors. Examples of determining a different level of service are described below.

In a first example of block 310, a different level of service may be desired based on identifying an endpoint from an address associated with the transaction. In some examples, the APM 100 may inspect the first packet and identify an endpoint from an address associated with the transaction. The endpoint may be a uniform resource indicator (URI) associated with a REST API that is demarcated as an important transaction. As an example, FIG. 8 illustrates a UI that may allow a network administrator to select specific services, which as associated with a URI, that are important.

In a second example of block 310, a different level of service may be desired based on determining that the transaction is suspicious based on application security information that identifies an exploit. For example, the APM 100 may interoperate with a security system to identify malicious attacks and may determine that the transaction is suspicious based on application security information that identifies an exploit. In this instance, the APM 100 may inspect packets to identify suspicious network data that could attempt exploiting the application. The APM 100 use application security information from the Open Web Application Security Project (OWASP) to analyze the network data to identify potential exploits based on injection, cross site scripting (XSS), authentication, and so forth.

In another example of block 310, a different level of service may be desired based on determining that the transaction is anomalous based on a client behavior within the application. For example, the APM 100 may be trained to identify behavior deviations. In such an example, the behavior deviations determine a likelihood of normal or abnormal behavior. Abnormal behavior could be security-based (e.g., trying to change a password) or could be behavior-based (e.g., inadvertently requesting access to a non-existing URI).

Another example of block 310 a different level of service may be desired based on determining whether data in the packet is deemed sensitive. For example, the APM 100 may be aware that data in particular database is highly sensitive and, therefore, would determine that data in the packet is deemed sensitive. In other examples, data may be deemed sensitive based on an authentication policy requiring an authentication, requesting a URI that requires a continuous multifactor authentication service that requires supplemental authentication to complete the transaction, and content within the data (e.g., a password, a social security number, etc.). As described in further detail below with respect to FIG. 6, the APM 100 may receive a message from an authentication service requiring an authentication to perform the transaction.

In yet another example of block 310, the method 300 determining to provide an alternate level of service by identifying a value of the transaction based on an inspection of the first packet. In this example, the APM 100 may prioritize specific transactions by identifying a value of the transaction based on an inspection of the first packet.

After block 310, the method 300 comprises modifying a field in the first packet to include metadata interpretable by at least one network device in the network to cause the at least one network device to provide the alternate level of service at block 315. For example, the APM 100 may modify a field in the first packet to include metadata interpretable by at least one network device in the network to cause the at least one network device to provide the alternate level of service (e.g., transaction awareness).

The transaction information may be implementation specific to the network and application function. In some examples, the transaction information may include a transaction confidentiality (e.g., sensitive data such as a sensitive database, changing financial details), a high-value transaction (e.g., significant monetary or business value), an anomalous transaction (e.g., a deviates from normal behavior), an urgent transaction, (e.g., a required transaction completion time), a suspicious transaction (e.g., a security risk such as an injection into a database), and a guaranteed transaction (e.g., requires additional effort to complete).

In some examples, an original value of the TOS field is copied into an encapsulating header of each packet that transits along the path (e.g., VXLAN, IPSec, etc.). The TOS field will be preserved even in an overlay environment, and mid-span, edge, border and cloud-based devices or services will be able to access the original TOS field.

In some examples, the method 300 modifies a TOS field, which includes the ECN field and the DSCP field, to include a flag to indicate the transaction requires an alternate level of service (transaction awareness). For example, the ECN field of the TOS field may be modified to indicate that the transaction is provided with the alternate level of service. A first bit (ECN Capable Transport or ECT) set to 0 means the device does not support ECN and a second bit (Congestion Experienced or CE) means the device experienced congestion, which can only be set by a device that supports ECT. In this example, the ECN field is set to "01" and indicates a logically contradictory state.

However, is a second example, a bit in a DSCP value indicates that the transaction is provided with the alternate level of service and remaining bits of the TOS field are modified to indicate transaction information (i.e., metadata) for the networking device. In yet another example, both the ECN field and the DSCP field can be modified.

Setting the ECT value to "01" and/or LSB-DSCP bit can be used as a flag to indicate that for the next one or more packets, metadata is being encoded into the DSCP bits within the TOS byte, replacing the prior value within these bits on a temporary basis. These six DSCP bits will then be used to encode and signal the metadata about the encompassed transaction to allow network devices (e.g., mid-span, edge, border, or cloud-based device or service) to interpret these six bits as a signal as to how the corresponding associated five-tuple flow is to be treated from a policy perspective.

According to some examples, the method 300 further includes injecting the first packet into the network at block 320. As noted above with respect to FIG. 2, the application may be instrumented with additional code to allow the APM to inspect and modify the packet. Accordingly, the APM 100 may be instrument the application with additional code to allow the APM 100 to inject the first packet into the network. As described below with respect to FIG. 4, network devices that support transaction awareness and receive the modified packet will analyze the modified packet and configure a flow to provide the alternate level of service for the transaction.

According to some examples, the method 300 further includes, after a predetermined number of packets associated with the transaction are modified to include the metadata, halting the modifying of the field for packets associated with the transaction at block 325. For example, the application may be instrumented with additional code to allow a number of packets to be modified to include the metadata for the network devices. The number of packets is implementation specific and a network operator sets the number to be sufficient to ensure that network devices in the network can receive the modified packets and configure the alternate level of service for the transaction. Thus, the APM 100 may, after a predetermined number of packets associated with the transaction are modified to include the metadata, halt the modifying of the field for packets associated with the transaction.

The method 300 may further include detecting completion of the transaction at block 330. For example, the APM 100 may receive an acknowledgment and detect completion of the transaction. In that case, it may be necessary to "un-flag" when the flow associated with the transaction to cause network devices to revert to normal service. To this end, APM 100 may set an ECN field with "01" again or set all DSCP bits to zero "000000" to indicate the transaction has completed. The APM 100 return the packet to the network and, when the at least one network device reverts to a normal level of service in response to receiving an acknowledgment that the transaction is complete.

According to some examples, the APM 100 may store data related to transaction performance, security purposes, legal requirements, non-repudiation, or other reasons for subsequent analysis. In this case, the method 300 includes analyzing packets associated with the transaction based on the service quality of the application and the alternate level of service at block 335. For example, the APM 100 may analyze packets associated with the transaction based on the service quality of the application and the alternate level of service. In some examples, the network devices that are configured for the transaction may also transmit the network data and metrics information to a data store for later analysis.

After analyzing the packets, the method 300 includes providing visual information to illustrate a difference between a normal level of service for the application and the alternate level of service at block 340. For example, the APM 100 may output a user interface to provide visual information to illustrate a difference between a normal level of service for the application and the alternate level of service.

Figure 4:
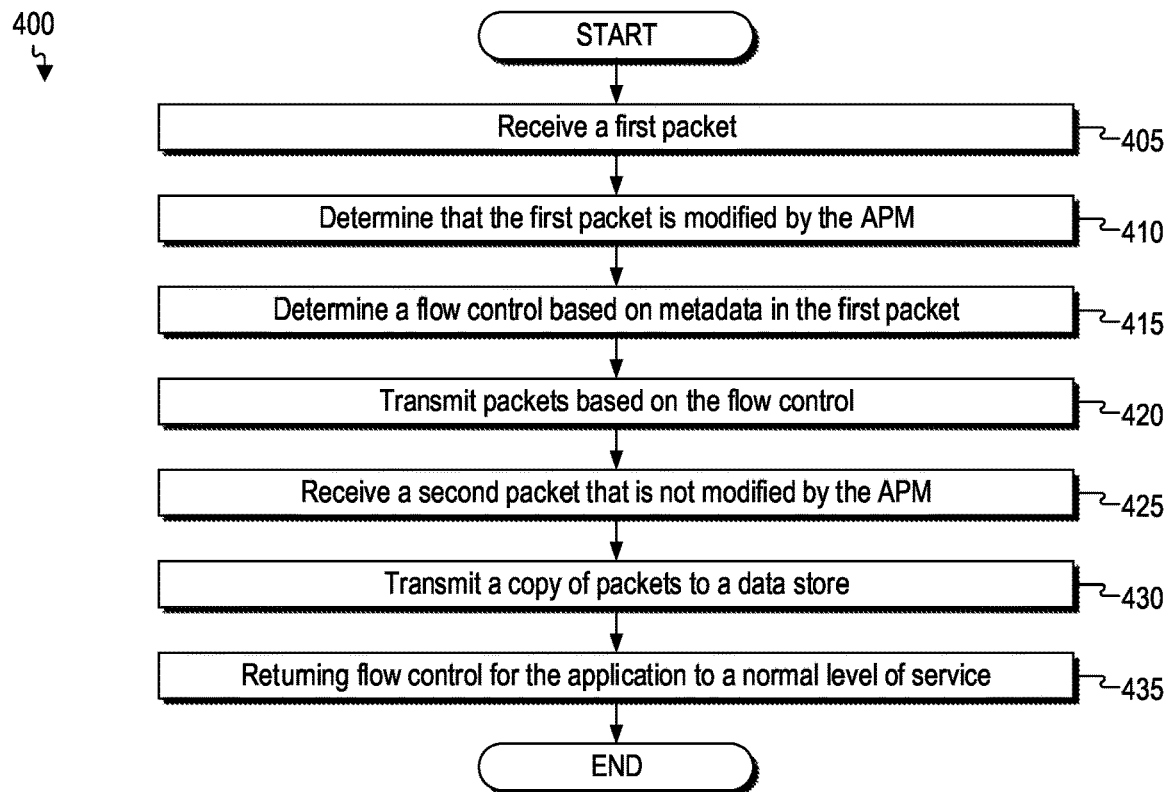
FIG. 4 is a flowchart of a method of an APM for configuring transactions at a network device according to an example of the instant disclosure.

FIG. 4 illustrates an example method 400 of a network device in a network that is monitored by an APM. The network device that executes the example method 400 may be implemented by, for example, the system 900 illustrated in FIG. 9. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method 400 includes receiving a first packet that is being transmitted in a network at block 405. For example, the processor 910 may be disposed in a network device (e.g., a switch, a router, etc.) and may receive a first packet that is be transmitted in a network. The first packet includes a modified field indicating an alternate level of service.

According to some examples, the method 400 includes determining that the first packet has been modified by the APM to provide a transaction of an application with the alternate level of service at block 410. For example, the processor 1010 illustrated in FIG. 10 may determine that the first packet has been modified by the APM to provide a transaction of an application with the alternate level of service. As described above, the ECN and/or DSCP fields may be modified to identify alternate levels of service.

An example of block 410 may include analyzing a field in the first packet that was modified by the APM. In some examples, the field includes characteristics of the transaction. The ECN can be a flag to instruct the network device to provide the alternate level of service and the DSCP field can identify different attributes associated with the level of service. After analyzing the field, block 420 can further include determining the alternate level of service based on the analysis of the field.

After block 410, the method 400 may determine a flow control for the application based on the alternate level of service at block 415. For example, the processor 910 illustrated in FIG. 9 may determine a flow control for the application based on the alternate level of service. In one example, the flow control may be premised on a normal quality of service with the application. The method 400 may create a unique flow entry for the flow control, which corresponds to the new transaction within the original flow that requires differentiated treatment, and associates this new flow with the transaction metadata. The network device may store a first entry in a flow table based on a normal level of service associated with the application and a second entry in the flow table based on the alternate level of service. When the network device determines that the transaction has been completed, the network device can revert back to the normal level of service using the first entry in the flow table.

After creating the flow control, the method 400 further includes transmitting packets associated with the transaction based on the flow control for the transaction at block 420. For example, the processor 910 illustrated in FIG. 9 may transmit packets associated with the transaction based on the flow control for the transaction. In some examples, the flow control for the transaction may provide a differentiated path selection (e.g., send "important" transaction traffic over a preferred path or paths), differentiated traffic treatment and handling for QoS/QoE, copy traffic to a local or external traffic store (e.g., using SPAN, RSPAN, or ERSPAN), or traffic counting/accounting (bytes, packets, flows). As noted above, because the packet modifications are temporary, subsequent packets in the transaction (except when a change occurs) will then be marked with the normal QoS settings.

According to some examples, the method 400 comprises receiving a second packet for the transaction of the application before the transaction is complete at block 425. The second packet is not modified by the APM because, as noted above in FIG. 3, the APM may only change a number of packets. Therefore the processor 910 may receive a second packet for the transaction of the application before the transaction is complete and continue to provide the alternate level of service to the transaction.

According to some examples, the method 400 includes transmitting a copy of packets associated with the transaction to a data store until the transaction is complete at block 430. For example, the processor 910 illustrated in FIG. 9 may transmit a copy of packets associated with the transaction to a data store until the transaction is complete. The method can also include transmitting metrics associated with the packets to the data store.

According to some examples, the method 400 includes, in response to determining that the transaction is complete, returning flow control for the application to a normal level of service at block 435. In some examples, an acknowledgement (ACK) from the web application may indicate that the transaction is completed. For example, when the transaction is completed, the processor 910 may determine that the transaction is complete and may return flow control for the application to a normal level of service.

In this example, the network device may use the flexible parser to inspect for and observe the presence of the ECT metadata-flag bits and/or LSB-in-DSCP-codepoint-field metadata-flag bits as described above. When such a flag is observed, the network device can compare the following bits in the TOS byte to the TOS byte data already cached as associated data for the corresponding flow. At this point, three outcomes are possible, all of which can be handled in hardware.

First, if the second flow, which designated by the ECT flag bits/LSB DSCP bit and encoded transaction metadata does not yet exist, a flow is created with the corresponding five-tuple and transaction metadata into the network device's flow table. In this case, the flow encountered is flagged as an important transaction. Once the second flow is carved into the flow table, the network device performs a local policy lookup (typically in device TCAM or SRAM) that matches the designated policy bits, and execute the identified policy. The network device may provide a differentiated path selection, change QoE levels, copy traffic, etc.

Second, if the second flow (designated by the ECT flag bits/LSB-DSCP bit+encoded transaction metadata) does already exist, then this is not the first time the flow has been encountered. For example, the user may have executed a confidential transaction previously, but is now executing a portion of that transaction that is both confidential and high-value. In this case, replace the second flow's associated transaction metadata in the device flow table with the updated metadata, perform a local policy lookup to match the updated designated policy bits, and execute the associated updated policy. For example, the updated policy may provide differentiated path selection, change QoE levels, copy traffic, etc. If the flow involved changed transaction-importance levels more than once, the prior transaction-importance level flow data should be exported prior to the updated flow-level metadata and associated policy being instantiated.

Third, in the event that the flags and associated transaction-importance metadata for the flow indicates a value of all zeroes for the metadata flags, or in the event that the primary (initial) flow in the flow table is deleted (FIN, RST flags received, flow timed out, etc.), the second flow with the associated transaction-importance metadata will also be deleted. In the event that the second flow is deleted, the initial flow data would be retained. Prior to any such flow being deleted, the flow data (including the transaction-importance metadata) should be exported.

The use of the flow table with two entries for the flow also provides additional benefits. Since both flows can be exported, and generally contain the same five-tuple data and differ only in their ECT/LSB-DSCP flags and TOS-byte metadata values) an external flow collector can correlate the two flows together and provide the following for the network operator data. For example, the network operator may be able to ascertain, at a minimum, total number of flows containing important transactions, total packets and bytes corresponding to such flagged-transaction flows, the count and types of all transactions flagged as important (i.e. reasons for flagged flows), and the handling that was given to such flow by the device in question (e.g., path selection, QoE alteration, traffic copy, etc.). This data will be very valuable to the network operator in order to determine if their most important and critical transactions are in fact being recognized by the network devices involved, whether the associated policies are being correctly executed, and the outcome of those policies to improve the effectiveness of the organization and the users and apps involved.

The presence of the two flows within the flow table also allows for an optimization in which the device's traffic-handling policy would be associated with the second flow, which contains the transaction-importance metadata, but the actual QoS traffic handing within the device would be based on the prior DSCP value as obtained from the first flow-table entry for the flow. Thus, the device could recognize the flow's signaled transaction importance via the modified TOS byte and act on this via policy, but still continue to execute the local QoS based on the prior value of the flow's TOS byte/DSCP bits as retained in the first flow-table entry. Alternatively, this local QoS handling could be as established by NBAR or other capability that the device may be using for QoS application.

The devices and/or services involved may export at least two flow records per-device/per-service to a centralized collector and correlator function: one for the initial flow, and another for the updated policy portion of that same flow.

Such a centralized flow processing service would absorb the network data from the designated devices/services involved, process the network data to produce a single correlated end-to-end view for the flow and the important transactions within it, and visualize and alert the network operator as needed so that the network operator could review flow and transaction status, and the proper operation of the overall system for designing, deploying, and monitoring important transaction status.

Thus, the network device can recognize multiple such sub-flows, realize the importance of the each sub-flow (important transaction) via reference to configured polices, and correlate the results together to provide a holistic end-to-end view of important and critical transactions to the organization. Thus, the method may identify important transactions and, via policy acted upon, by mid-span, edge, border, and cloud-based network elements or services, provide a better treatment for such transactions within the network, improved security, and greater visibility at a transaction.

Figure 5:
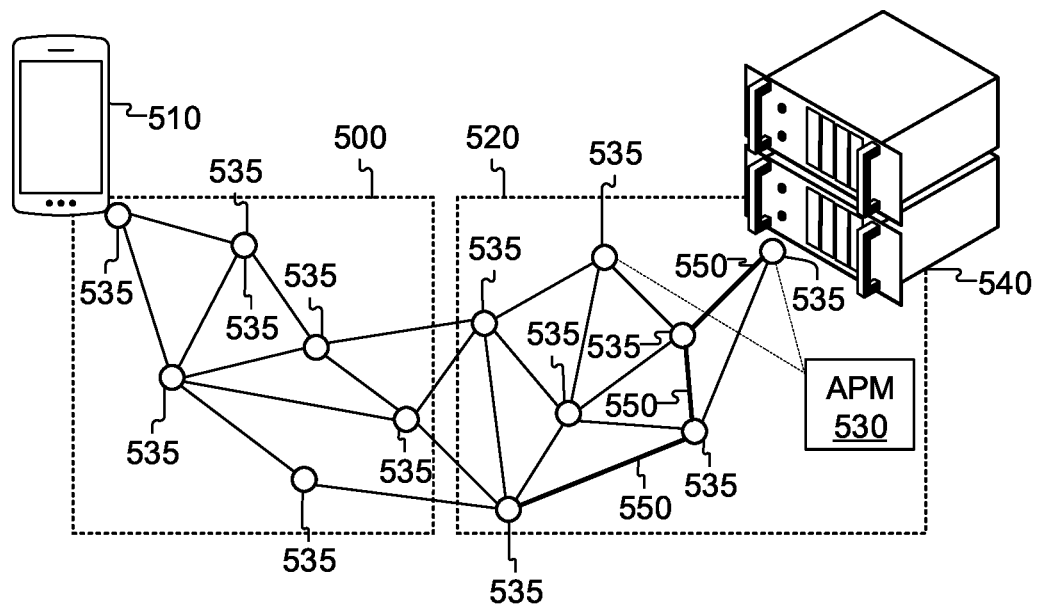
FIG. 5 illustrates an example network that is modified to provide an alternate level of service to an application according to an example of the instant disclosure.

FIG. 5 illustrates an example network that is modified to provide an alternate level of service to an application according to an example of the instant disclosure. The network illustrated in FIG. 5 comprises a public network 500 including a plurality of network devices 535 (or nodes) that connect to a client device 510 that is executing an application (e.g., a web application). A network 520 of an entity may be monitored by an APM 530 and can have a number of network devices 535 (e.g., switches, routers, mid-spans) between the entry point of the network 520 (e.g., a firewall) and a server 540 that hosts the application or a part of the application. As described above with respect to FIG. 2, the APM 530 may be configured to monitor different network devices 535 (e.g., servers, databases, applications, network devices) in the network 530 to analyze application and network performance.

In some examples, the client device 510 may be purchasing an item of significant value that is important to the business entity associated with the application. The APM 530 may identify this transaction requires an alternate level of service to ensure improved service for the duration of this transaction. Accordingly, the APM 530 may intercept a packet associated with the transaction and modify the packet to insert metadata to reconfigure an alternate level of service within the network 520. The APM 530 inserts the packet back into the network device to transmit the packet to the destination (e.g., client device 510 or server 540). As the modified packet is transmitted within the network 520, the various network nodes may detect that the modified packet includes metadata to indicate that the network device is to provide the alternate level of service for the duration of this transaction. In some embodiments, the modified packet can be destined for a destination outside of network 520. In such situations too, the modified packet can be acted on by devices it traverses within network 520. When the modified packet leaves network 520, the metadata can be cleared at the network boundary or it can even be left as is, as devices outside of network 520 either do not interpret the metadata or do not act on it.

In this case, the network devices within the network 520 configure a prioritized path 550 that has higher reliability, lower delay, lower loss, and/or lower jitter. The network 520 is configured with the prioritized path until the transaction of an application is completed, at which time the network devices within the network 520 return any communication of the application to a normal level of service. As noted above, the transaction is an instance of a communication and can be a purchase, an authentication, confidential data, and so forth.

Figure 6A:
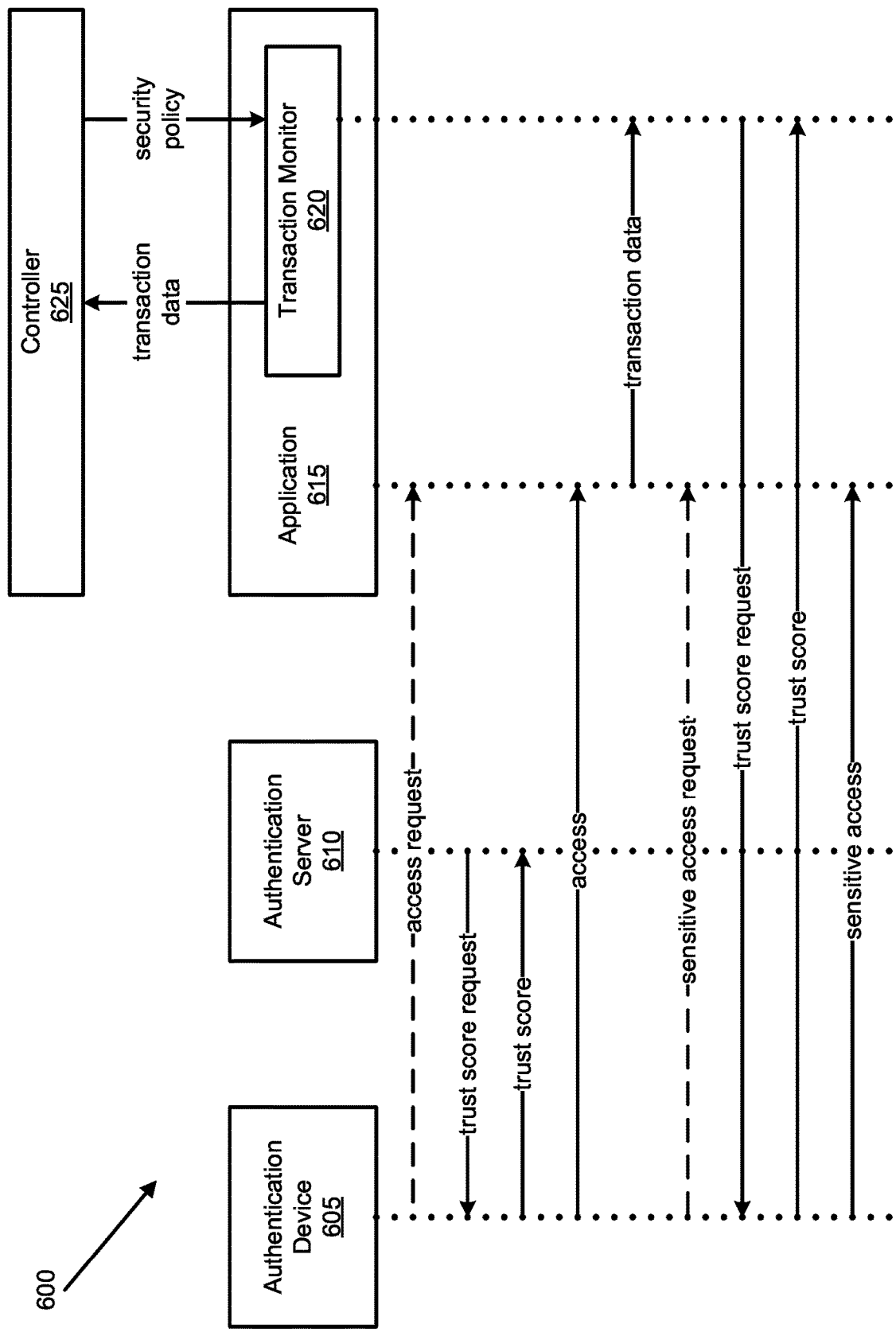
FIGS. 6A and 6B illustrate example systems integrating an authentication system with a monitoring system.
Figure 6B:
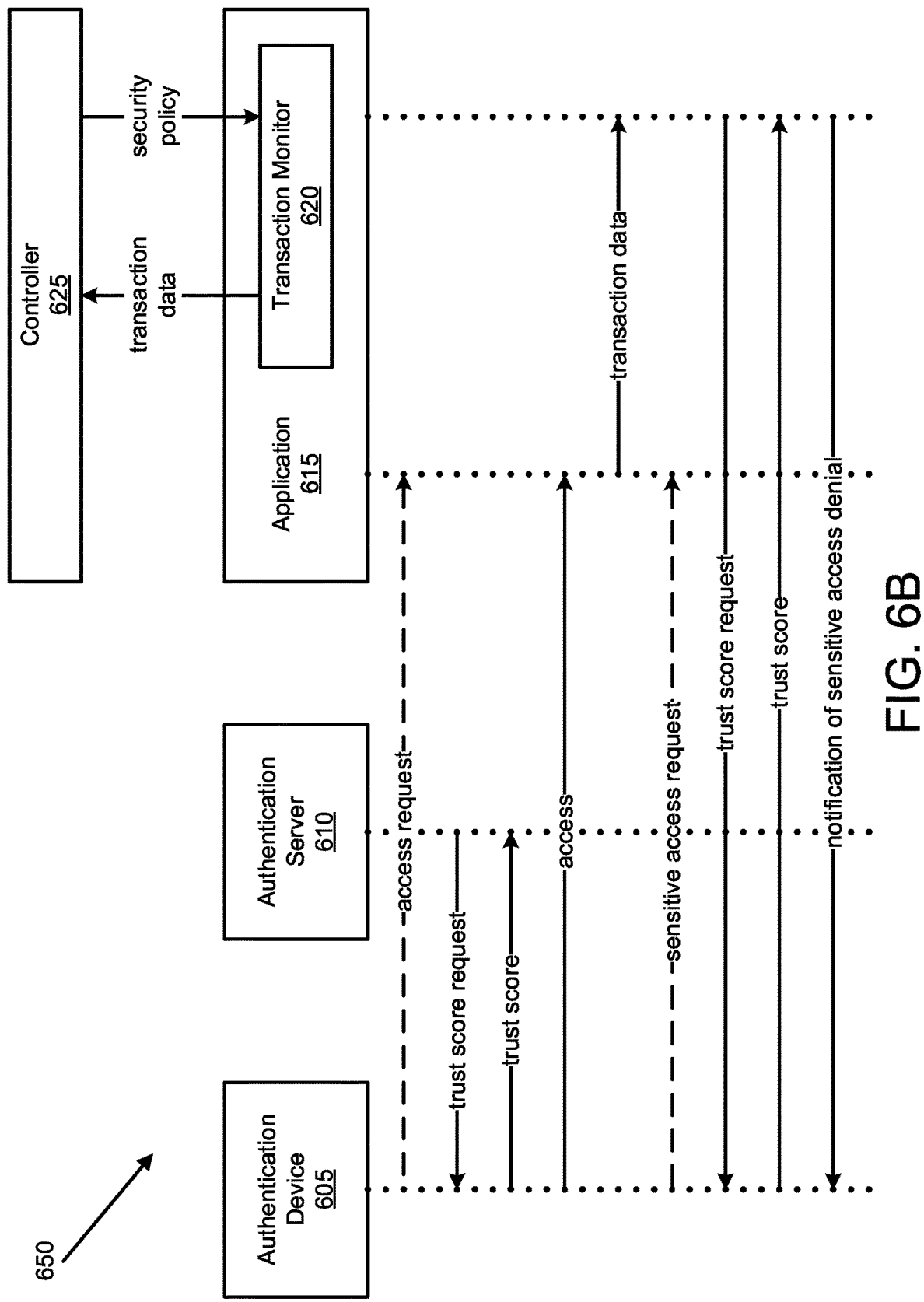

FIGS. 6A and 6B illustrate example systems integrating an authentication system, such as the one illustrated in FIG. 1, with a monitoring system, such as the one illustrated in FIG. 2.

FIG. 6A illustrates a system 600 for applying a security policy by an application security system to a transaction within an application that is monitored by the application security system. Authentication device 605 can be substantially similar to CMFA device 120 illustrated in FIG. 1. Authentication server 610 can be substantially similar to trusted authentication provider 160 illustrated in FIG. 1. Application 615 can be substantially similar to resource 170 illustrated in FIG. 1 or to application servers 230, 240, 250, or 260 illustrated in FIG. 2, and can, for example, be the payroll application discussed above. Transaction monitor 620 can be substantially similar to agents 234, 244, 254, or 264 illustrated in FIG. 2. Controller 625 can be substantially similar to controller 290 illustrated in FIG. 2

Transaction monitor 620 can monitor transactions taking place in application 615, including the entry and exit points of all individual transactions within application 615. Each transaction can be given a default name, such as a concatenation of the TCP socket and URI stem, or a custom name. By monitoring transactions within application 615, transaction monitor can give granular insight into transactions when it sends transaction data to controller 625.

A network administrator can operate controller 625 to manage transactions within application 615 and apply policies to such transactions. Sensitive transactions can be identified in multiple ways, including the explicit tagging of sensitive transactions by a network administrator, regular expression (regex) filters searching for key terms in default or custom names, or the use of a supervised machine learning model applied to transaction names. A sensitive transaction can be, for example, one that accesses private data or one that gives user control over an important operation. In a payroll application, editing bank details can be defined as a sensitive transaction by the network administrator.

A network administrator can identify sensitive transactions and apply policies via controller 625 using a GUI or other interface. To identify sensitive transactions, the GUI can present a list of recorded transactions, and the network administrator can identify a subset of these transactions as sensitive. The GUI can also allow a network administrator to apply policies to the identified sensitive transactions. For example, an authentication policy can require a multifactor authentication, a continuous multifactor authentication, a supplementary password authentication, a secret question authentication, a Yubikey check, or an explicit device-driven facial recognition authentication. More details on the GUI are addressed with respect to FIG. 8.

In addition to creating custom names for transactions, the network administrator can, via controller 625, create classes of transactions. Classes of transactions can be all transactions with a certain name, certain TCP socket, certain URI stem, or other properties. Classes of transactions may or may not consist entirely of the same type of transaction; for instance, to return to the payroll application example, a class of transactions might include viewing tax information and editing bank details, and the same policies could be applied to every transaction in the class. Classes of transactions can be nested such that new thresholds may need to be met; for instance, viewing bank details can require a certain authentication, and editing bank details can require further authentication.

Transaction monitor 620 can receive information related to sensitivity of transactions and security policies from controller 625. Transaction monitor 620 can then apply these security policies to the appropriate transactions in real time, as detailed below.

Authentication device 605, or a paired access device, can make a login request to application 615. In order to log in, the user of authentication device 605 must authenticate him or herself to authentication server 610. To do this, authentication server 610 can request a trust score from authentication device 605 after pausing the access request for authentication. When authentication device 605 returns the trust score and it is above a trust threshold, authentication server 610 can allow the login to continue, and the user of authentication device 605 can access application 615. The login process illustrated here is substantially similar to that illustrated in FIG. 1 between CMFA device 120, trusted authentication provider 160, and resource 170. Authentication server 610 can regularly request a trust score from authentication device 605 to maintain the trust level.

Transaction monitor 620 can monitor transactions between authentication device 605 or an associated access device and application 615. Transaction monitor 620 can monitor transaction data from application 615 as application 615 receives requests from authentication device 605 or an associated access device and fulfills them.

Authentication device 605 or an associated access device can make a request of application 615 to initiate a sensitive transaction. Instead of immediately fulfilling the request, transaction monitor 620 is able to identify the transaction as a sensitive transaction and interrupt the transaction. For example, interrupting the transaction can occur by transaction monitor 620 intercepting a call to an API (such as changing direct deposit information in a payroll application) by using Byte Code Injection into a Java Virtual Machine (JVM).

Once it is interrupted, transaction monitor 620 can prompt authentication device 605 for an authentication in accordance with an authentication policy for the sensitive transaction. A trust score is but one example of an authentication factor which transaction monitor 620 could request. Once received, transaction monitor 620 can evaluate the trust score against a trust score threshold or generic authentication threshold to determine if authentication device 605 or associated access device should be allowed to complete the sensitive transaction with application 615.

An example code snippet enacting the interruption, the subsequent trust score request to authentication device 605, and the ultimate decision to allow or disallow the sensitive transaction can be:

```
package com.cisco.tenant.methodhandlers;
import com.cisco.utils.ServletUtils;
public class ExtendedAuthenticationMethodHandler extends
TenantMethodHandler {
  private ServletUtils servletUtils;
  private ExtendedAutSourceWrappers extendedAutSourceWrappers;
  private long waitTime;
  ExtendedAuthenticationMethodHandler( ) {
    servletUtils = new ServletUtils( );
    ExtendedAuthSourceWappers = new
    ExtendedAuthSourceWrappers( );
  }
```

```
  public void handlerEntry(Object inst, Object[ ] args, String
  className, String method, String signature, String id) throws
  CiscoUnauthorizedAccess {
    String requestURL = servletUtils.getRequestURL(args[0]);
    String requestUser =
        servletUtils.getRequestUser(args[0]);
    String requestRole =
        servletUtils.getRequestRole(args[0]);
    String transactionName =
        appdynamicsAgent.getTransactionName(requestURL);
    boolean isAuthenticated =
        extendedAutSourceWrappers.validateWithExtendedSources(req
        uestURL, requestUser, requestRole, transactionName);
    if (!isAuthenticated) {
      throw new CiscoUnauthorizedAccess("Not authorized to
      access transaction "+transactionName+", please increase
      your access level...");
    }
  }
  public void handlerExit(Object returnVal, Object inst, Object[ ]
  args, String className, String method, String signature, String
  id) {
  }
}
```

Before requesting the trust score from authentication device 605, transaction monitor 620 can send the details of the authentication policy to authentication server 610 or authentication device 605 to configure those devices and ensure that the appropriate authentication factors are returned.

In some embodiments, authentication server 610 can, in some cases, send a notification of authentication to transaction monitor 620 in place of authentication device 605 sending the authentication factors directly to transaction monitor 620. In these cases, transaction monitor 620 trusts authentication server 610 to authenticate authentication device 605 or an associated access device in accordance with the authentication policy. For example, the payroll application could receive an authentication notification from the bank of the user accessing the direct deposit information instead of receiving the authentication factors directly.

Having received the trust score or an authentication notification from authentication device 605, transaction monitor 620 can end its interruption of the sensitive transaction and allow the transaction to proceed.

FIG. 6B illustrating system 650 is substantially similar to FIG. 6A save for the final step of the illustrated process. In this situation, the trust score received by transaction monitor 620 from authentication device 605 does not meet the threshold set by the authentication policy. Thus, transaction monitor 620 can send a notification to authentication device 605 or an associated access device indicating the authentication threshold was not cleared. This notification can be presented within the browser window by which the user is accessing application 615, as a notification on the device (such as an iOS or Android notification), or via other means that, to the user, the notification appears to be presented by the application. In addition, transaction monitor 620 can prevent the sensitive transaction from proceeding.

Figure 7:
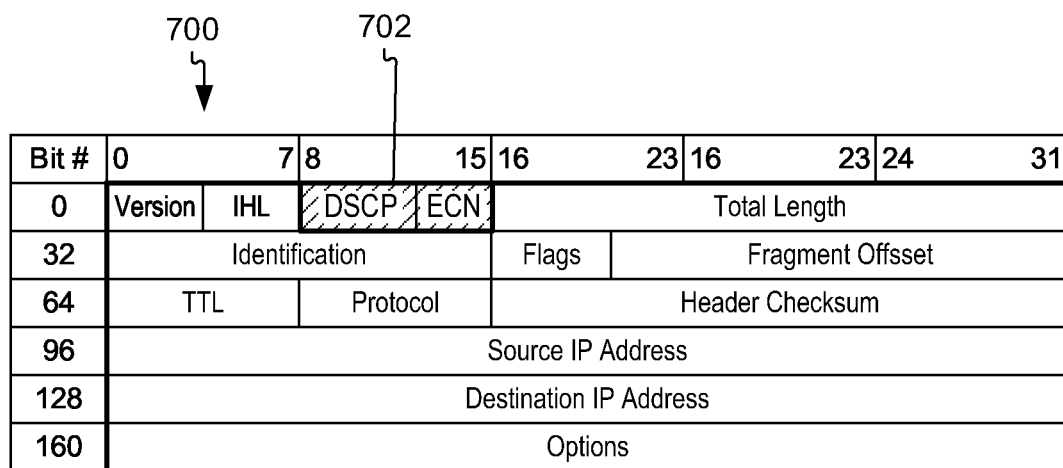
FIG. 7 illustrates a packet header that is modified to include metadata according to an example of the instant disclosure.

FIG. 7 illustrates a packet header 700 that is modified to include metadata according to an example of the instant disclosure. A packet header 700 provides 192 bits of information and includes a 1 byte TOS field 702, which comprises the DSCP field and the ECN field. As described above, the network devices can be configured to detect a transaction requires an alternate level or service by modifying the DSCP and/or ECN field. The packet header 700 is not encrypted and network devices along the network can receive the packet header 700 to identify the alternate level of service.

FIG. 8 illustrates a user interface 800 for configuring different transactions according to an example of the instant disclosure. The user interface 800 comprises a grid (e.g., a table) that is sortable, filterable, and groupable to display different types of applications and applications functions to a user. The user interface 800 may include an important or sensitive transaction column 810 that includes a user interface control (e.g., a checkbox) to identify any important or sensitive transactions associated with this application and/or application function. User interface 800 can be operated by a network administrator to apply security policies to transactions via controller 325 illustrated in FIGS. 6A and 6B.

In user interface 800, each transaction type can have a row with attributes displayed, including name, original name, health, response time, max response time, calls, CPU used, type, or other attributes. Some transactions can have custom names, such as "Fetch Catalog," while others will be named by their function, such as "viewCart.address." A network administrator can use the information displayed in graphical user interface 800 to investigate problems in the application, manage sensitive transactions, or perform other administrative actions.

The user interface 800 in this example indicates that the fetch catalog function and a view cart function may be important or sensitive transactions. The user interface 800 allows the designer of the application or network administrator to assign important transactions that enable the APM to improve network performance of these important transaction.

In some embodiments, user interface 800 can further allow a network administrator to apply specific security policies to a transaction identified as sensitive. For instance, "Add To Cart" and "viewCart.address" are both defined as sensitive transactions in user interface 800; however, it may be that they are best managed by having different security policies applied. In such cases, there could be another column allowing the network administrator to choose the appropriate security policy, or an interface to create a new policy, for each sensitive transaction.

In some examples, the user interface 800 could have more options. For example, the user interface 800 may include an option to store all network traffic associated with an application and/or an application function. The user interface 800 may also identify parameters to optimize (e.g., loss, delay, jitter, etc.).

Figure 9:
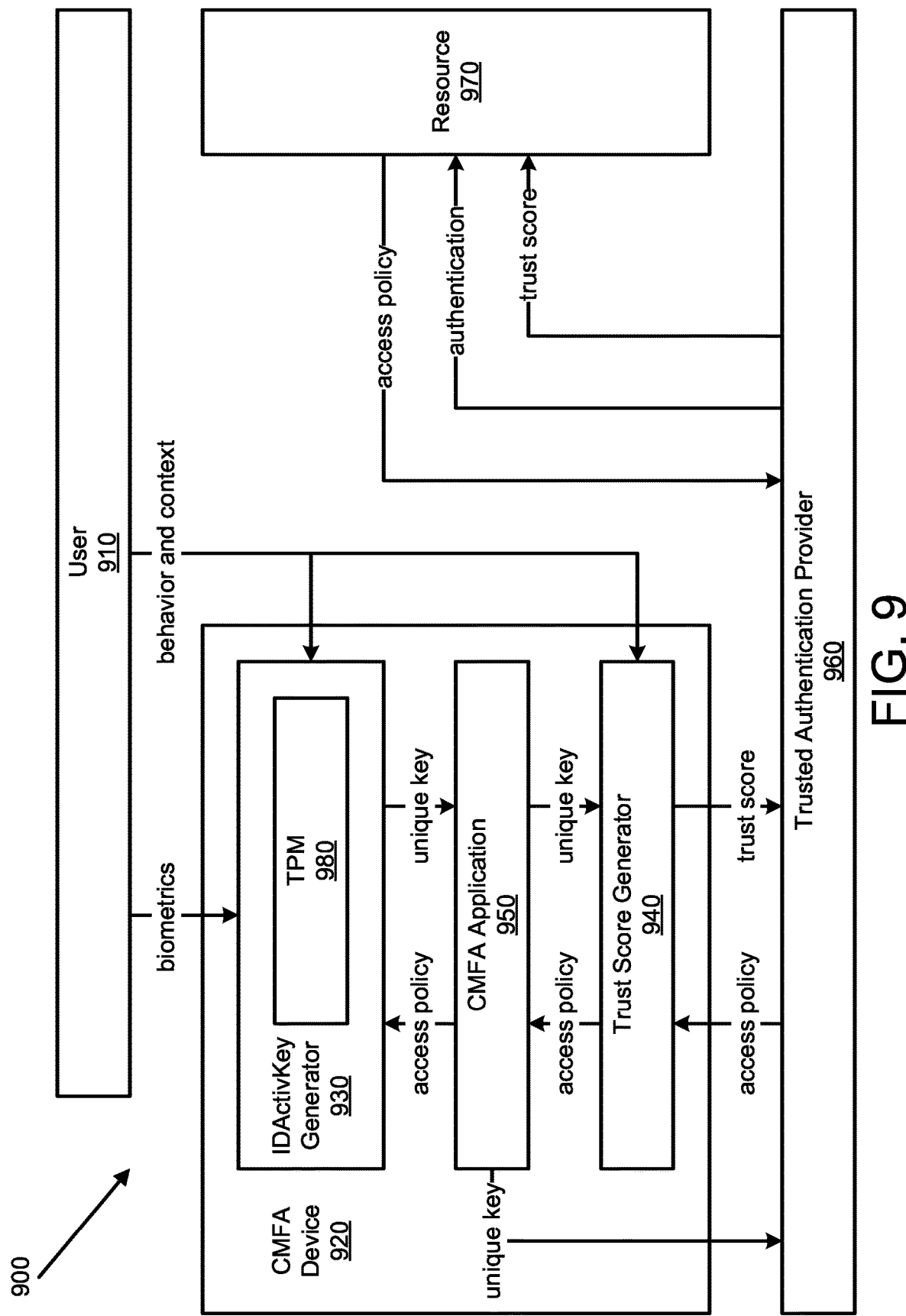
FIG. 9 illustrates an example continuous multi-factor authentication (CMFA) system in accordance with some aspects of the present technology.

FIG. 9 illustrates an example continuous multi-factor authentication (CMFA) system 900 in accordance with some aspects of the present technology. User 910 can gain authorized access to resource 970 by using CMFA device 920.

Resource 970 can be any service, resource, device, or entity which requires authentication of user 910. For example, resource 970 can be a social media service, bank, hospital, motor vehicle department, bar, voting system, Internet of Things (JOT) device, or access device. In some embodiments, resource 970 can be accessed by user 910 through an access device, such as a mobile phone or personal computer. In some embodiments, resource 970 can be accessed by user 910 through an application that is specifically designed for accessing resource 970, or through a more general application which can access multiple services, such as a web browser, or portions of an operating system. In some embodiments, resource 970 can be the same device as CMFA device 920. In some embodiments, resource 970 can be a plurality of resources, such as an access device and a service which receive separate authentications from trusted authentication provider 960.

Resource 970 can authenticate the identity of user 910 through trusted authentication provider 960, which can be in communication with CMFA device 920. Data gathered by CMFA device 920 can be used for authentication of user 910 to resource 970 via trusted authentication provider 960. Trusted authentication provider 960 can receive an identification credential, such as an IDActivKey, from CMFA device 920 via CMFA application 950 that is unique to resource 970 for user 910. Trusted authentication provider 960 can also receive a trust score from CMFA device 920 via trust score generator 940. Upon receiving an IDActivKey and a trust score, trusted authentication provider 960 can use this information in tandem with access requirements received from resource 970 to authenticate user 910 to resource 970.

To generate identification credentials, CMFA Device 920 can be associated with user 910 and can gather biometric, behavioral, and contextual data from user 910. The biometric, behavioral, or contextual data, or some combination thereof, can be used by IDActivKey generator 930 to generate a unique IDActivKey corresponding to resource 970. These biometrics can include, for example, fingerprints, facial detection, retinal scans, voice identification, or gait data, among other biometrics. For each resource 970, a cryptographic seed from a pseudo-arbitrary number generator in trusted platform module (TPM) 980 can be used to select a sampling of the biometric data to be used in an IDActivKey for the application in question. In some embodiments, the IDActivKey may only be derived when CMFA device 920 determines that certain behavioral and contextual requirements indicate compliance with a policy. In some embodiments, there can be a "master" IDActivKey that is used to gain access to trusted authentication provider 960.

In some embodiments, behavioral and contextual data can be used to ensure that the context of user 910 is acceptable as specified by a policy of resource 970. Behavioral and contextual data can be used by trust score generator 940, which can generate a trust score as a measure of confidence in the authentication of user 910, and as a measure of confidence that the authenticated user 910 is still present and behaving acceptably as specified by a policy of resource 970.

In some embodiments, trusted computing implementations, such as TPM 980, can rely on roots of trust. Roots of trust can provide assurances that the root has been implemented in a way that renders it trustworthy. A certificate can identify the manufacturer and evaluated assurance level (EAL) of TPM 980. Such certification can provide a level of confidence in the roots of trust used in TPM 980. Moreover, a certificate from a platform manufacturer may provide assurance that TPM 980 was properly installed on a system that is compliant with specific requirements so the root of trust provided by the platform may be trusted. Some implementations can rely on three roots of trust in a trusted platform, including roots of trust for measurement (RTM), storage (RTS), and reporting (RTR).

Trust score generator 940 can generate a trust score for user 910 using behavioral and contextual data, the surrounding environment, or other sources. For example, location information can be derived from the network that user 910 is using. These data can include information about location, movement, or device behavior. The trust score reflects a confidence level that user 910 complies with a policy specified by resource 970. This includes the confidence that user 910 is the person operating the current session.

Trusted authentication provider 960 can request updated IDActivKeys and trust scores at different intervals depending on the requirements specified by the access policies defined by resource 970. It can send new access policies received from resource 970 during a session to CMFA device 920. Trusted authentication provider 960 can shield private information from resource 970, providing authentication without revealing personal information such as birth dates, social security numbers, or marital status, etc. In some embodiments, trusted authentication provider 960 need only inform resource 970 that access should be granted, while in some embodiments trusted authentication provider 960 can send an IDActivKey to resource 970.

User 910 can be any user including an employee, contractor, client, member of an organization, or private individual, etc. attempting to access a service. User 910 can use an access device to access resource 970 which may or may not be the same device as CMFA device 920. In some embodiments, CMFA device 920 can be used to authenticate an access device.

CMFA device 920 can be hardware, software-only, or combinations thereof. CMFA device 920 can be a mobile device or a personal computer; it may or may not be the same device as access device. In some embodiments, CMFA device 920 can include secure hardware such as TPM 980. In some embodiments, one or more of IDActivKey generator 930, TPM 980, and trust score generator 940 can be located in a physically separate and secure portion of CMFA device 920.

While FIG. 9 only illustrates one resource 970, it should be appreciated that there can be any number of resources 970. Each resource 970 can have an access policy, and any IDActivKey will be unique to each respective resource 970.

While FIG. 9 illustrates a CMFA system 900 which can be used to execute aspects of the present technology, it does not illustrate an application security system which can monitor transactions within an application and which can apply a security policy to such transactions. Aspects of such an application security system are illustrated in FIG. 2.

Figure 10:
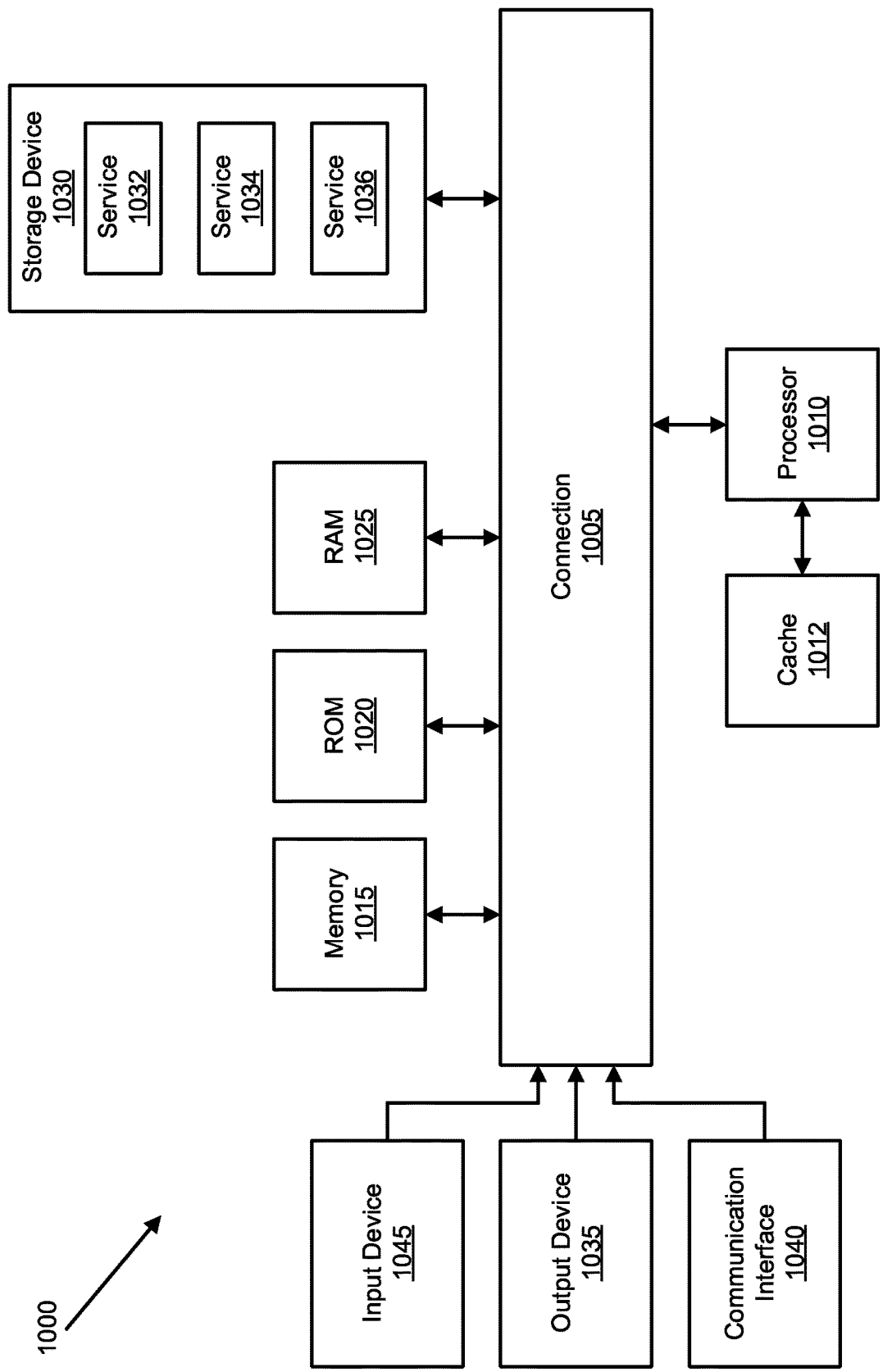
FIG. 10 illustrates an example of a computing system for implementing certain aspects of the present technology.

FIG. 10 shows an example of computing system 1000, which can be for example any computing device making up transaction monitor 320 or any component thereof in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement, and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method for applying a security policy by an application security system to a transaction within an application that is monitored by the application security system, the method comprising:
    monitoring transactions occurring between a client device and the application over a network;
    identifying a first transaction from the transactions as a sensitive transaction at least in part by applying a supervised machine learning algorithm to identify a transaction name that is associated with the sensitive transaction, wherein the sensitive transaction is associated with an authentication policy requiring an authentication that is more trustworthy than an authentication for a non-sensitive transaction;
    interrupting the application; and
    prompting the client device for the authentication.

2. The method of claim 1, further comprising:
    defining the authentication policy for a class of transactions, wherein the authentication policy requires an authentication for the class of transactions, wherein the first transaction is in the class of transactions.

3. The method of claim 2, wherein the authentication policy requires a multifactor authentication, a continuous multifactor authentication, a supplementary password authentication, a secret question authentication, a Yubikey check, or an explicit device-driven facial recognition authentication.

4. The method of claim 2, wherein the class of transactions is defined by a transaction name, wherein the transaction name is a concatenation of a TCP socket and a URI stem, or a customized name.

5. The method of claim 1, wherein identifying the first transaction as the sensitive transaction comprises:
    configuring the application security system to classify transactions having the transaction name matching a filter or specific string as sensitive; and
    matching the first transaction by its name to the filter or specific string.

6. The method of claim 5, wherein configuring the application security system to classify the transaction further comprising:
    presenting a graphical user interface listing a plurality of transactions recorded by the application security system; and
    receiving a selection of a subset of the plurality of transactions in the graphical user interface, wherein the selection of the subset of the plurality of transactions is used to configure the application security system to classify transactions in the selection as sensitive.

7. The method of claim 1, wherein interrupting the application comprises:
    intercepting, by the application security system, a call to an API for sensitive transactions in a runtime environment by using Byte Code Injection into a Java Virtual Machine (JVM).

8. The method of claim 1, after prompting the client device for the authentication, the method further comprising:
    requesting at least one authentication factor from an authentication system;
    receiving the at least one authentication factor from the authentication system; and
    evaluating a measure of the at least one authentication factor against an authentication threshold.

9. The method of claim 1 further comprising:
    before prompting the client device for the authentication, sending, by the application security system, an instruction to an authentication service effective to configure the authentication service to authenticate a user associated with the client device according to a policy; and
    after prompting the client device for the authentication, receiving, by the application security system, a confirmation from the authentication service that the user associated with the client device has successfully authenticated according to the policy.

10. The method of claim 1, further comprising:
    receiving, by the application security system, a confirmation from an authentication service that a user associated with the client device has successfully authenticated according to a policy; and
    allowing the transaction to proceed.

11. The method of claim 1, further comprising:
    receiving, by the application security system, a notification from an authentication service that a user associated with the client device has not authenticated according to a policy;
    sending a notification to the client device indicating that an authentication threshold was not cleared, wherein the notification is configured to be presented by a browser window presenting the application, thereby the notification appears to be presented by the application; and
    preventing the transaction from proceeding.

12. The method of claim 1, wherein the application security system performs the method without altering source code for the application.

13. A system for applying a security policy by an application security system to a transaction within an application that is monitored by the application security system, the system comprising:
- at least one processor; and
- at least one non-transitory computer-readable medium having stored therein instructions which, when executed by the at least one processor, cause the at least one processor to perform operations comprising:
- monitoring transactions occurring between a client device and the application over a network;
- identifying a first transaction from the transactions as a sensitive transaction at least in part by applying a supervised machine learning algorithm to identify a transaction name that is associated with the sensitive transaction, wherein the sensitive transaction is associated with an authentication policy requiring an authentication that is more trustworthy than an authentication for a non-sensitive transaction;
- interrupting the application; and
- prompting the client device for the authentication.

14. The system of claim 13, wherein the instructions, when executed by the at least one processor, further cause the at least one processor to perform operations comprising:
- defining the authentication policy for a class of transactions, wherein the authentication policy requires an authentication for the class of transactions, wherein the first transaction is in the class of transactions.

15. The system of claim 14, wherein the authentication policy requires a multifactor authentication, a continuous multifactor authentication, a supplementary password authentication, a secret question authentication, a Yubikey check, or an explicit device-driven facial recognition authentication.

16. The system of claim 14, wherein the class of transactions is defined by a transaction name, wherein the transaction name is a concatenation of a TCP socket and a URI stem, or a customized name.

17. A non-transitory computer-readable medium having stored therein instructions for applying a security policy by an application security system to a transaction within an application that is monitored by the application security system which, when executed by a processor, cause the processor to perform operations comprising:
- monitoring transactions occurring between a client device and the application over a network;
- identifying a first transaction from the transactions as a sensitive transaction by applying a supervised machine learning algorithm to identify a transaction name that is associated with the sensitive transaction, wherein the sensitive transaction is associated with an authentication policy requiring an authentication that is more trustworthy than an authentication for a non-sensitive transaction;
- interrupting the application; and
- prompting the client device for the authentication.

18. The non-transitory computer-readable medium of claim 17, wherein the instructions, when executed by the at least one processor, further cause the processor to perform operations comprising:
- receiving, by the application security system, a confirmation from an authentication service that a user associated with the client device has successfully authenticated according to a policy; and
- allowing the transaction to proceed.

19. The non-transitory computer-readable medium of claim 17, wherein the instructions, when executed by the at least one processor, further cause the processor to perform operations comprising:
- receiving, by the application security system, a notification from an authentication service that a user associated with the client device has not authenticated according to a policy;
- sending a notification to the client device indicating that an authentication threshold was not cleared, wherein the notification is configured to be presented by a browser window presenting the application, thereby the notification appears to be presented by the application; and
- preventing the transaction from proceeding.

* * * * *